(12) United States Patent
Park et al.

(10) Patent No.: US 11,357,015 B2
(45) Date of Patent: Jun. 7, 2022

(54) SIDELINK SIGNAL MEASUREMENT AND RESOURCE SELECTION IN VEHICLE-TO-EVERYTHING COMMUNICATIONS

(71) Applicant: QUALCOMM Incorporated, San Diego, CA (US)

(72) Inventors: Cheol Hee Park, San Diego, CA (US); Ashish Shankar Iyer, San Diego, CA (US); Arvind Vardarajan Santhanam, San Diego, CA (US); Hongsan Sheng, San Diego, CA (US); Subramanya Rao, Sunnyvale, CA (US); Feng Lu, Santa Clara, CA (US); Santosh Kumar Rongala, San Diego, CA (US); Li Sheng, San Diego, CA (US); Yuanbo Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/228,200

(22) Filed: Dec. 20, 2018

(65) Prior Publication Data
US 2019/0200366 A1 Jun. 27, 2019

Related U.S. Application Data

(60) Provisional application No. 62/609,706, filed on Dec. 22, 2017.

(51) Int. Cl.
*H04W 72/08* (2009.01)
*H04W 24/08* (2009.01)
(Continued)

(52) U.S. Cl.
CPC ........ *H04W 72/085* (2013.01); *H04B 17/318* (2015.01); *H04L 43/16* (2013.01);
(Continued)

(58) Field of Classification Search
None
See application file for complete search history.

(56) References Cited

U.S. PATENT DOCUMENTS 6,169,761 B1 * 1/2001 Marcoccia ........... H04B 1/7156
455/226.1
2006/0063545 A1 * 3/2006 Yang .................... H04B 17/318
455/513

(Continued)

FOREIGN PATENT DOCUMENTS

EP 2991247 A1 * 3/2016 ............. H04B 17/23

OTHER PUBLICATIONS

Astri et al., "Resource Selection for V2X Systems Supporting CA", 3GPP TSG-RAN WG1 Meeting #90bis, 3GPP Draft; R1-1717415— Resource Selection for V2X Systems Supporting CA, 3rd Generation Partnership Project (3GPP), Mobile Competence Centre, 650, Route Des Lucioles, F-06921 Sophia-Antipolis Cedex, France, vol. RAN WG1. No. Prague, CZ; Oct. 9, 2017-Oct.13, 2017, Oct. 8, 2017 (Oct. 8, 2017), pp. 1-5, XP051340604, Retrieved from the Internet: URL: http://www.3gpp.org/ftp/Meetings_3GPP_SYNC/RAN1/Docs/ [retrieved on Oct. 8, 2017].

(Continued)

*Primary Examiner* — Christopher T Wyllie
(74) *Attorney, Agent, or Firm* — Arent Fox LLP

(57) ABSTRACT

Aspects of the present disclosure implement techniques that allow a vehicle performing V2X communications to provide more accurate S-RSSI measurements and CBR calculations for use in channel selection and congestion control. Techniques may include measuring a sidelink received signal strength indicator (S-RSSI) for each of a plurality of sub-channels, determining one or more signal impairment adjustment factors based on the S-RSSI for each of the plurality of sub-channels, calculating a channel busy ratio (CBR) for the plurality of sub-channels based on the one or (Continued)

more signal impairment adjustment factors, and initiating communication with at least one of the plurality of sub-channels based on at least the CBR.

27 Claims, 5 Drawing Sheets

(51) Int. Cl.
　　*H04W 4/40* 　　(2018.01)
　　*H04L 43/16* 　　(2022.01)
　　*H04B 17/318* 　(2015.01)
　　*H04W 72/04* 　 (2009.01)

(52) U.S. Cl.
　　CPC ............. *H04W 4/40* (2018.02); *H04W 24/08* (2013.01); *H04W 72/0486* (2013.01)

(56) References Cited

U.S. PATENT DOCUMENTS

| | | | |
|---|---|---|---|
| 2006/0187884 A1* | 8/2006 | Ma | H04W 40/16 370/332 |
| 2007/0060155 A1* | 3/2007 | Kahana | H04W 72/085 455/450 |
| 2007/0121552 A1* | 5/2007 | Lindoff | H04B 17/336 370/333 |
| 2007/0286122 A1* | 12/2007 | Fonseca | H04L 43/0894 370/329 |
| 2008/0075035 A1* | 3/2008 | Eichenberger | H04W 36/08 370/328 |
| 2009/0201208 A1* | 8/2009 | McPherson | G01S 5/02 342/458 |
| 2010/0144294 A1* | 6/2010 | Han | H03J 1/0066 455/186.1 |
| 2011/0051797 A1* | 3/2011 | Won | H04L 25/03019 375/232 |
| 2012/0003942 A1* | 1/2012 | Grunert | H04W 72/082 455/73 |
| 2013/0286870 A1* | 10/2013 | Fujita | H04W 24/02 370/252 |
| 2017/0181197 A1 | 6/2017 | Aguirre et al. | |
| 2017/0366983 A1* | 12/2017 | Gunasekara | H04L 43/0817 |
| 2018/0124771 A1* | 5/2018 | Mok | H04W 24/10 |
| 2018/0234973 A1* | 8/2018 | Lee | H04W 88/04 |
| 2018/0332564 A1* | 11/2018 | Lee | H04W 72/048 |
| 2018/0359713 A1* | 12/2018 | Boban | H04W 64/00 |
| 2019/0166423 A1* | 5/2019 | Anderson | G06F 3/16 |
| 2019/0182840 A1* | 6/2019 | Feng | H04W 4/44 |
| 2019/0200366 A1* | 6/2019 | Park | H04W 72/085 |
| 2019/0208441 A1* | 7/2019 | Wang | H04W 28/0284 |
| 2019/0223046 A1* | 7/2019 | Lee | H04W 28/0231 |
| 2019/0261216 A1* | 8/2019 | Lee | H04W 72/0406 |
| 2019/0313279 A1* | 10/2019 | Li | H04W 28/0284 |
| 2019/0319723 A1* | 10/2019 | Axmon | H04W 24/08 |
| 2019/0372653 A1* | 12/2019 | Chae | H04W 4/00 |
| 2019/0373502 A1* | 12/2019 | Chae | H04W 72/12 |
| 2019/0373637 A1* | 12/2019 | Lee | H04W 8/005 |
| 2020/0015272 A1* | 1/2020 | Lee | H04W 72/121 |
| 2020/0029245 A1* | 1/2020 | Khoryaev | H04W 72/0486 |
| 2020/0170009 A1* | 5/2020 | Chae | H04W 24/10 |
| 2020/0275458 A1* | 8/2020 | Khoryaev | H04W 4/46 |

OTHER PUBLICATIONS

Huawei et al., "Discussion on RRM Test Cases for V2X", 3GPP TSG-RAN WG4 Meeting #82bis, 3GPP Draft; R4-1703602, 3rd Generation Partnership Project (3GPP), Mobile Competence Centre, 650, Route Des Lucioles ; F-06921 Sophia-Antipolis Cedex, France, vol. RAN WG4, No. Spokane, WA, USA; Apr. 3, 2017-Apr. 7, 2017, Apr. 3, 2017 (Apr. 3, 2017), pp. 1-5, XP051246764, Retrieved from the Internet: URL: http://www.3gpp.org/ftp/Meetings_3GPP_SYNC/RAN4/Docs/ [retrieved on Apr. 3, 2017], p. 3.

International Search Report and Written Opinion—PCT/US2018/067139—ISA/EPO—dated Feb. 28, 2019.

Nokia et al., "Discussion on UE Measurement Requirements for Collision Avoidance and Congestion Control", 3GPP TSG-RAN WG4 Meeting #81, 3GPP Draft; R4-1609290, 3rd Generation Partnership Project (3GPP), Mobile Competence Centre, 650, Route Des Lucioles ; F-06921 Sophia-Antipolis Cedex, France, vol. RAN WG4, No. Reno, USA; Nov. 14, 2016-Nov. 18, 2016, Nov. 14, 2016 (Nov. 14, 2016), 7 Pages, XP051179590, Retrieved from the Internet: URL: http://www.3gpp.org/ftp/Meetings_3GPP_SYNC/RAN4/Docs/ [retrieved on Nov. 14, 2016].

Qualcomm Incorporated: "Discussion on PSSCH-RSRP Measurement Test", 3GPP TSG-RAN WG4 Meeting #85, 3GPP Draft; R4-1712282—Discussion on PSSCH-RSRP Measurement Test, 3rd Generation Partnership Project (3GPP), Mobile Competence Centre, 650, Route Des Lucioles ; F-06921 Sophia-Antipolis Cedex, France, vol. RAN WG4, No. Reno, USA; Nov. 27, 2017-Dec. 1, 2017, Nov. 17, 2017 (Nov. 17, 2017), pp. 1-5, XP051374021, Retrieved from the Internet: URL: http://www.3gpp.org/ftp/tsg%5Fran/WG4%5FRadio/TSGR4%5F85/Docs/ [Retrieved on Nov. 17, 2017].

* cited by examiner

SIDELINK SIGNAL MEASUREMENT AND RESOURCE SELECTION IN VEHICLE-TO-EVERYTHING COMMUNICATIONS

CROSS REFERENCE TO RELATED APPLICATIONS

The current application claims priority to U.S. Provisional Patent Application No. 62/609,706 entitled "SIDELINK SIGNAL MEASUREMENT AND RESOURCE SELECTION IN VEHICLE-TO-EVERYTHING COMMUNICATIONS," filed on Dec. 22, 2017, the content of which is incorporated by reference in its entirety.

BACKGROUND

The present disclosure relates generally to telecommunications, and specifically to techniques for vehicle to everything (V2X) communications using channel metrics adjusted to reduce noise from factors impacting a signal or driven by events. Such techniques may provide improved channel selection for future transmissions and congestion control during data transmission or reception.

Vehicle to everything (V2X) is a communication protocol that enables direct communication between a vehicle and a variety of communication partners. V2X encompasses several more specific communication protocols such as vehicle to grid (V2G), vehicle to vehicle (V2V) and vehicle to infrastructure (V2I). In order to determine the distance of a communication element from the vehicle, a sidelink received signal strength indicator (S-RSSI) is used to detect and monitor variations in the strength of a signal between the vehicle and the communication element. The S-RSSI measurements are used by the vehicle in calculating channel busy ratio (CBR) indicating how "full or busy" a channel is. This information may be used in selecting channels for future transmissions.

However, S-RSSI measurements per sub-channel of a communication link may be impacted by other sub-channel signals. More specifically, the received strength of a signal carried on any particular sub-channel, including an unoccupied sub-channel, may be affected by noise. The signal noise introduced by occupied sub-channels may increase the S-RSSI of an adjacent unoccupied (or occupied) sub-channel as perceived and measured by the vehicle, causing error in the S-RSSI measurement of the adjacent sub-channel. For instance, if the S-RSSI is high due to the RF impairments, the resource selection may unnecessarily avoid this S-RSSI-inflated sub-channel. Thus, conventional methods of S-RSSI measurement and channel selection may be inaccurate.

Similarly, conventional methods of calculating sub-channel CBR can lead to inaccurate determinations as to how busy a particular channel is at any point in time. Miscalculation in the CBR of a sub-channel may lead to improper congestion control. For example, if signal leakage occurs, a sub-channel S-RSSI may be measured as higher than it actually is and the resultant CBR may be too high, causing the vehicle to throttle back it's transmissions. Similarly, if the CBR is too low, the vehicle may improperly overload the sub-channel with new transmissions, creating congestion.

Thus, improvements in V2X communications may be desired.

SUMMARY

Aspects of the present disclosure solve the above-identified problem by implementing techniques that allow vehicles to adjust either S-RSSI measurements or CBR calculations to remove or mitigate signal noise. Some aspects may enable direct removal of signal noise from an S-RSSI measurement through the removal of a bias associated with a particular type of signal noise. For example, one proposed solution includes offsetting S-RSSI measurement to remove signal noise attributable to noise such as, but not limited to, direct current (DC) power, signal interference, signal image, and inter-sub-channel signal leakage. Other aspects may include using a dynamic CBR threshold that may be adjusted as signal noise increases or decreases. In other aspects, the CBR threshold may be directly modified to remove specific types of signal noise. These techniques may enable the vehicle to provide more accurate S-RSSI measurements and CBR calculations for use in channel selection and congestion control. Such techniques may improve the quality of V2X communications by enabling the vehicle to select clear channels for future transmissions and/or by reducing the likelihood that current communications will lead to congestion.

In one example of the present disclosure, a method for controlling wireless communication is disclosed. The method may include measuring a sidelink received signal strength indicator (S-RSSI) for each of a plurality of sub-channels, determining one or more signal impairment adjustment factors based on the S-RSSI for each of the plurality of sub-channels, calculating a channel busy ratio (CBR) for the plurality of sub-channels based on the one or more signal impairment adjustment factors, and initiating communication with at least one of the plurality of sub-channels based on at least the CBR.

In another example, a vehicle and/or wireless access terminal for wireless communication is disclosed. The vehicle and/or wireless access terminal may include a processor and a memory coupled to the processor. The memory may include instructions executable by the processor to measure a S-RSSI for each of a plurality of sub-channels, determine one or more signal impairment adjustment factors based on the S-RSSI for each of the plurality of sub-channels, calculate a CBR for the plurality of sub-channels based on the one or more signal impairment adjustment factors, and initiate communication with at least one of the plurality of sub-channels based on at least the CBR.

In yet another example, a computer-readable medium storing computer executable code for wireless communications. The computer-readable medium may include code to measure a S-RSSI for each of a plurality of sub-channels, code to determine one or more signal impairment adjustment factors based on the S-RSSI for each of the plurality of sub-channels, code to calculate a CBR for the plurality of sub-channels based on the one or more signal impairment adjustment factors, and code to initiate communication with at least one of the plurality of sub-channels based on at least the CBR.

In another example, a vehicle and/or wireless access terminal for wireless communication is disclosed. The vehicle may include means for measuring a S-RSSI for each of a plurality of sub-channels, means for determining one or more signal impairment adjustment factors based on the S-RSSI for each of the plurality of sub-channels, means for calculating a CBR for the plurality of sub-channels based on the one or more signal impairment adjustment factors, and means for initiating communication with at least one of the plurality of sub-channels based on at least the CBR.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

BRIEF DESCRIPTION OF THE DRAWINGS

Various aspects of apparatuses and methods will now be presented in the detailed description by way of example, and not by way of limitation, with reference to the accompanying drawings.

DETAILED DESCRIPTION

Figure 1:
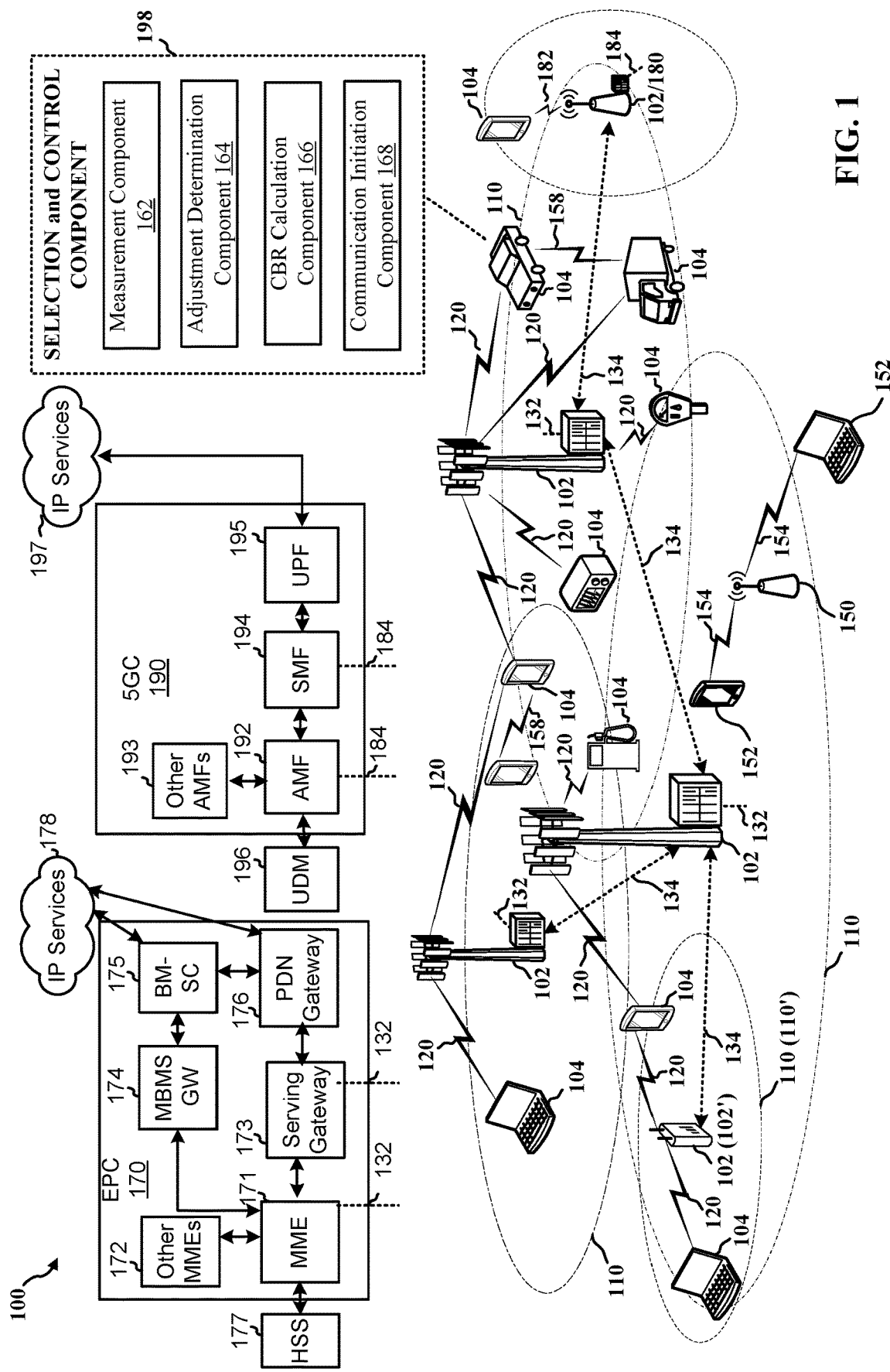
FIG. 1 is a diagram illustrating an example of a wireless communications system including a user equipment having a selection and control component that takes into account noise when making sidelink received signal strength measurements for resource selection and/or channel busy measurements.

Techniques of the present disclosure allow a vehicle performing vehicle-to-everything (V2X) communications with various communications partners to mitigate the impact of signal noise on S-RSSI measurements for sub-channels. Signal noise in a given sub-channel may include, but is not limited to, direct current (DC) power, signal interference, signal image, and leakages (including other non-linearities such as image) from other occupied sub-channels. Signal noise may cause a measured S-RSSI to appear stronger (e.g., if signal leakage has caused spillover into a measured sub-channel) than the signal would appear without the signal noise. Consequently, a channel busy ratio (CBR) calculated from such erroneous S-RSSI measurements, or using a CBR threshold based on a guess as to a noise level, may lead a processor of the vehicle to determine that a channel or sub-channel is busier than the channel or sub-channel actually is. If the vehicle selects a sub-channel for transmitting data based on an erroneously-calculated CBR (e.g., through use of a CBR threshold that is too high or too low, or by not adjusting the measured S-RSSI for signal impairment), the vehicle may inadvertently select a sub-channel that is too congested to support the data transmission.

Thus, aspects of the present disclosure solve this problem by implementing techniques that allow the vehicle to provide more accurate S-RSSI measurements and CBR calculations for use in channel selection and congestion control in V2X communications. The vehicle may implement these techniques by measuring a sidelink received signal strength indicator (S-RSSI) for each of a plurality of sub-channels, determining one or more signal impairment adjustment factors based on the S-RSSI for each of the plurality of sub-channels, calculating a channel busy ratio (CBR) for the plurality of sub-channels based on the one or more signal impairment adjustment factors, and initiating communication with at least one of the plurality of sub-channels based on at least the CBR. In some cases, the one or more signal impairment adjustment factors may include one or more threshold adjustment values that modify a CBR threshold against which measured S-RSSIs are compared in determining whether a sub-channel is busy or not busy when calculating the CBR. In other cases, the one or more signal impairment adjustment factors may include one or more S-RSSI adjustment values for modifying the S-RSSI measurements used for comparing against the CBR threshold in determining whether a sub-channel is busy or not busy when calculating the CBR. Thus, these techniques may improve the quality of V2X communications by enabling the vehicle to select clear channels for future transmissions and/or by reducing the likelihood that current communications will lead to congestion on the channel.

Various concepts will now be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

In the following description, the terms "vehicle", "wireless station" and "STA" are used interchangeably to refer to devices configured to perform vehicle to everything (V2X) communications.

Referring to FIG. 1, an example of a wireless communications system 100 includes one or more wireless stations (STAs) 104, such as a vehicle STA 104, having a selection and control component 198 configured to take into account signal noise in S-RSSI measurements in order to more accurately determine a CBR of a sub-channel for resource selection and/or congestion control in V2X communications. As such, the selection and control component 198 is configured to improve V2X communications between STAs 104 and other STAs or any other communications device or base station 102 or infrastructure element of an evolved packet core (EPC) 170 or infrastructure element of a fifth generation core (5GC) 190 configured to perform V2X communications. The selection and control component 198 may include a measurement component 162, adjustment determination component 164, CBR calculation component 166 and communication initiation component 168. The measurement component 162 may measure a sidelink received signal strength indicator (S-RSSI) of a sub-frame of sub-channels in device to device communication links. The measured S-RSSIs may be used by the adjustment determination component 164, which is configured to determine one or more signal impairment adjustment factors, e.g., an offset or bias that should be applied to the measurement, or to a product/function of the measurement, or to a CBR threshold used in a CBR calculation, in order to compensate for signal noise. The CBR calculation component 166 may determine a CBR for one or more sub-channels, and/or for an entire channel (e.g., the corresponding plurality of sub-channels).

The communication initiation component 168 may select a sub-channel or channel for resource selection or transmission based on the calculated CBR. Each STA 104 may implement one or more of these subcomponents 162, 164, 166, and 168 to improve the quality of device-to-device communications using V2X.

The wireless communications system 100 may also be referred to as a wireless wide area network (WWAN), and may include a plurality of base stations 102 for serving a plurality of STAs 104, and enabling communication across the EPC 170 or 5GC 190.

The base stations 102 may include macro cells (high power cellular base station) and/or small cells (low power cellular base station). The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 170 through backhaul links 132 (e.g., S1 interface). The base stations configured for 5G NR (collectively referred to as Next Generation RAN (NG-RAN)) may interface with the 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 170 or 5GC 190) with each other over backhaul links 134 (e.g., X2 interface). The backhaul links 134 may be wired or wireless.

The base stations 102 may wirelessly communicate with the STAs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the STAs 104 may include uplink (UL) (also referred to as reverse link) transmissions from a STA 104 to a base station 102 and/or downlink (DL) (also referred to as forward link) transmissions from a base station 102 to a STA 104. The communication links 120 may use multiple-input and multiple-output (MIMO) antenna technology, including spatial multiplexing, beamforming, and/or transmit diversity. The communication links may be through one or more carriers. The base stations 102/STAs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain STAs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in traditional sub 6 Hz spectrum, in millimeter wave (mmW) frequencies and/or near mmW frequencies in communication with the STA 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 182 with the STA 104 to compensate for the extremely high path loss and short range. Additionally, STAs 104 performing D2D communications may operate using mmW and may also utilize beamforming 182.

The EPC 170 may include a Mobility Management Entity (MME) 171, other MMEs 172, a Serving Gateway 173, a Multimedia Broadcast Multicast Service (MBMS) Gateway 174, a Broadcast Multicast Service Center (BM-SC) 175, and a Packet Data Network (PDN) Gateway 176. The MME 171 may be in communication with a Home Subscriber Server (HSS) 177. The MME 171 is the control node that processes the signaling between the STAs 102 and the EPC 170. Generally, the MME 171 provides bearer and connection management. All user Internet protocol (IP) packets are transferred through the Serving Gateway 173, which itself is connected to the PDN Gateway 176. The PDN Gateway 176 provides UE IP address allocation as well as other functions. The PDN Gateway 176 and the BM-SC 175 are connected to the IP Services 178. The IP Services 178 may include the Internet, an intranet, an IP Multimedia Subsystem (IMS), a PS Streaming Service, and/or other IP services. The BM-SC 175 may provide functions for MBMS user service provisioning and delivery. The BM-SC 175 may serve as an entry point for content provider MBMS transmission, may be used to authorize and initiate MBMS Bearer Services within a public land mobile network (PLMN), and may be used to schedule MBMS transmissions. The MBMS Gateway 174 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the STAs 102 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base stations 102 may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 170 or the 5GC 190 for a STA 104.

The STAs 104 may include a vehicle, a user equipment, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the STAs 104 may be referred to as IoT devices (e.g., parking meter, gas pump, toaster, vehicles, heart monitor, etc.). The STA 104 may also be referred to as a station, a mobile station, a subscriber station, a user equipment, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. In certain aspects, the STA 104 may be located within a vehicle and configured for V2X communications.

Figure 2A:
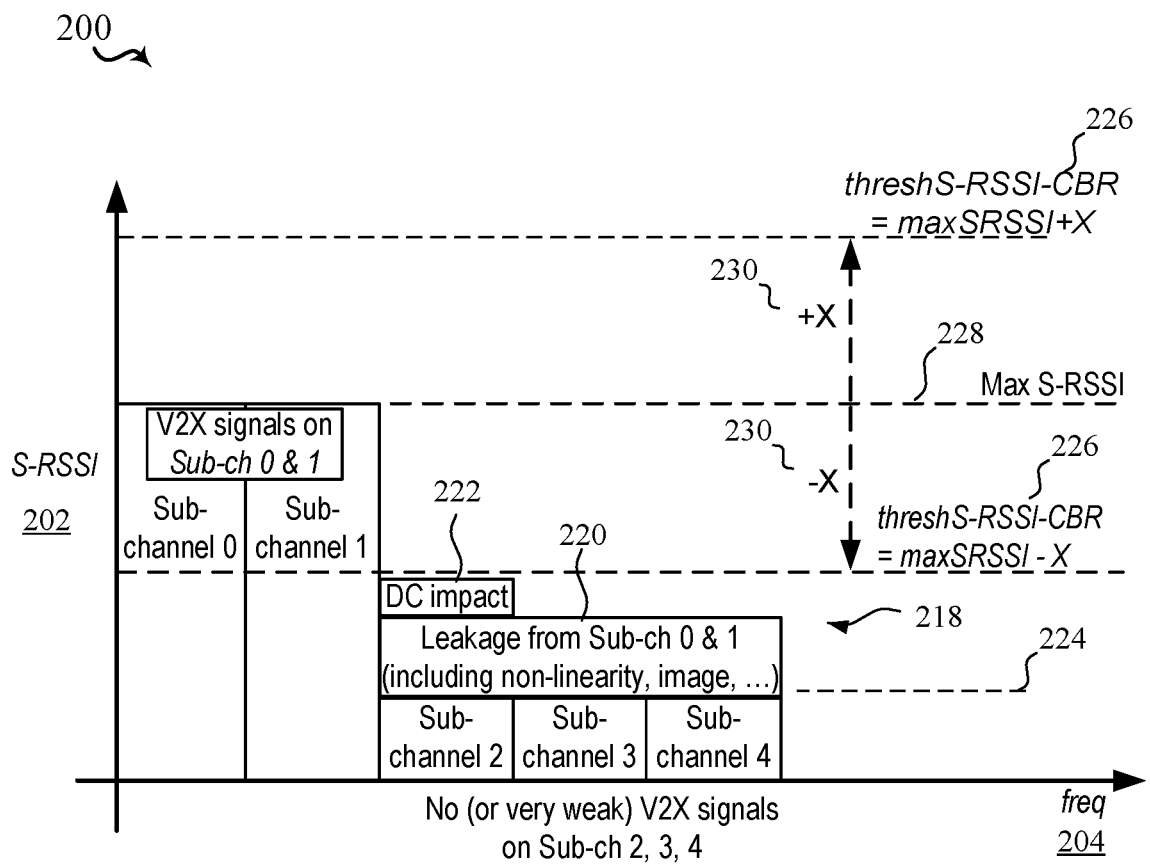
FIG. 2A is a graph of noise impact on example S-RSSI strength measurements across sub-channel frequencies, and corresponding threshold adjustments, in accordance with aspects of the present disclosure.

Referring to FIG. 2A, an example of actual measurements 200 of S-RSSI strength 202 across sub-channel frequencies 204 are used by the selection and control component 198 to make adjustments to a dynamic CBR threshold 226 (also referred to as threshS-RSSI-CBR) for use in calculating a more accurate CBR to account for noise in the actual S-RSSI measurements. The sub-channel S-RSSI measurements 200 may be performed by a vehicle or other STA 104 (e.g., wireless station) described with reference to FIG. 1 above.

In this example, one or more sub-channels (e.g., sub-channel 0 and sub-channel 1) may host V2X communications, while other sub-channels (e.g., sub-channels 2-4) have little or no V2X traffic but may include signal noise 218 from the occupied sub-channels. Specifically, the measured S-RSSI of sub-channels 0 and 1 may be relatively high (as compared to other sub-channels) due to the volume of data traffic supported on those sub-channels. However, the measured S-RSSI of sub-channels 2-4 may be artificially inflated due to the presence of signal noise 218 above an ideal noise floor 224. The signal noise 218 may include, but is not limited to, one or both of DC power interference 222 and signal leakage 220 (including non-linearity, image, etc.), from the occupied sub-channels 0 and 1. In various aspects, the selection and control component 198 is configured to dynamically determine the CBR threshold 226 according to how high the values of the measured S-RSSI of a channel are at any given time. For example, the dynamic CBR threshold 226 may be a threshold S-RSSI for use in calculating CBR (or threshS-RSSI-CBR), which is a threshold amount or level or value of S-RSSI that defines when a sub-channel may be considered to be occupied or busy, versus not occupied or not busy, when calculating the CBR. For instance, in calculating the CBR, whether a sub-channel is busy or not busy may be determined by comparing the measured S-RSSI to the threshS-RSSI-CBR, and if the measured S-RSSI is above the threshS-RSSI-CBR then the sub-channel may be considered busy, and if the measured S-RSSI is equal to or below the threshS-RSSI-CBR then the sub-channel may be considered not busy. In an example implementation, the CBR for a plurality of sub-channels in a channel may be calculated such that CBR=(number of sub-channels whose S-RSSIs are above the CBR threshold)/ (total number of sub-channels). In some cases, a 100 ms time window may be used for the sub-channel consideration of the measured S-RSSI, although other time values may be utilized. In one implementation, the CBR threshold 226 may be equal to a measured maximum S-RSSI (max S-RSSI) 228 of the plurality of sub-channels plus or minus a signal impairment adjustment factor 230 (e.g., a threshold adjustment value; "X" in FIG. 2A), the value of which can vary depending on if the max S-RSSI 228 is relatively high or relatively low. In some implementations, the determination as to whether the measured max S-RSSI is relatively high or low may be based, at least in part, on a result of comparing the measured max S-RSSI to a noise floor. For example, in one implementation, the noise floor of the plurality of sub-channels may be approximately −107 dBm, and thus the relative difference between the measured S-RSSI and the noise floor may be compared to one or more thresholds to judge if the measured S-RSSI may be considered to be relatively high and/or relatively low. If the maximum sub-channel S-RSSI 228 measurement(s) are relatively high, the STA 104 executing the selection and control component 198 may use a value of signal impairment adjustment factor 230 that results in setting a relatively high threshS-RSSI-CBR 226 to mitigate the impact of signal noise 218, such as DC power 222 and signal leakage 220, on the CBR. If the maximum sub-channel S-RSSI 228 measurement(s) are relatively low, the STA 104 executing selection and control component 198 may use a value of signal impairment adjustment factor 230 that results in setting a relatively low or predetermined, default threshS-RSSI-CBR 226 to account for the relatively lower level of signal noise 218 existing in a sub-channel. In other words, in this example, the signal impairment adjustment factor 230 may be a variable value that is combined with a measured S-RSSI, e.g., the max S-RSSI 228, to obtain the dynamic CBR threshold 226. The usage of such S-RSSI measurements for determining the dynamic CBR threshold 226 may be per subframe (SF), or filtered or individually-determined across SFs, and the STA 104 may apply a statistic or function to such S-RSSI measurement values, such as a maximum or average or some other mapping or biasing.

For instance, the selection and control component 198 can determine whether the max S-RSSI 228 is relatively high or relatively low by comparing the value to a threshold, or to multiple thresholds (e.g., a low max S-RSSI threshold and a high max S-RSSI threshold). The value of signal impairment adjustment factor 230 may be positive or negative, and may be correlated to different levels of the measured max S-RSSI 228. For example, in one implementation, if using a low max S-RSSI threshold and a high max S-RSSI threshold, the selection and control component 198 can scale the value of the signal impairment adjustment factor 230 (e.g., "X" in FIG. 2A) by an amount the measured max S-RSSI 228 exceeds the high max S-RSSI threshold or by an amount the measured max S-RSSI 228 is under the low max S-RSSI threshold. Further, if the measured max S-RSSI 228 is between the low max S-RSSI threshold and the high max S-RSSI threshold, then selection and control component 198 can set the CBR threshold 226 to a default value. It should be understood that this is one example implementation, and that other rules can be used for adjusting the CBR threshold 226 based on the measured S-RSSI in one or more sub-channels. Thus, the CBR threshold 226 may be adjusted based on an amount of signaling in one or more adjacent sub-channels, for example, to an increased value when there is a relatively high amount of signaling or to a decreased value when there is a relatively low amount of signaling, to account for the corresponding presence of a relatively high or low amount of signal noise 218 that, without this threshold adjustment, would result in an inaccurate CBR calculation.

The selection and control component 198 may determine the max S-RSSI 228 according to any one of a plurality of different rules and/or mathematical functions. For instance, various aspects may include using a maximum S-RSSI measurement, or using an average S-RSSI measurement, or using any other mathematical function applied to measured S-RSSI values. Further, selection and control component 198 may then apply a mapping of the determined max S-RSSI 228 to a corresponding value of signal impairment adjustment factor 230 to determine what value of CBR threshold 226 should be implemented. For example, the mapping between the max S-RSSI 228 and the signal impairment adjustment factor 230 to obtain CBR threshold 226 may be any function such as look-up table, a biasing function, or a linear or non-linear function.

In various aspects, the use of S-RSSI measurements in calculating a CBR threshold 226, e.g., the threshS-RSSI-CBR, may be applied to a single transmission sub-frame or may be applied across sub-frames. In other words, the calculated dynamic CBR threshold 226 may be an individual calculation that may be different in different sub-channels, or the calculated dynamic CBR threshold 226 may be a common value applied across all sub-channels.

In some cases, the signal impairment adjustment factor 230 may be based on one or more types of signal noise 218 that may be determined, assumed, or predicted to be associated with signaling in an occupied sub-channel. Such signal noise 218 may include, but is not limited to, DC power interference, signal interference, signal image, and signal leakage. In some implementations, the type of signal impairment may be determined. In some cases, for example, the location of sub-channels including signal impairment may be determined based on the location of sub-channels that include known V2X transmissions. For example, DC-impacted sub-channel(s) may be identified, as such impairment will likely be located in the center sub-channel(s). Signal image (or IQ image) may be identified as symmetric sub-channels with regard to the center frequency of the strong sub-channels. Other general leakage signal impairments may be determined by identifying the strong sub-channels S-RSSI levels. Thus, in some aspects, signal impairments may be identified in order to fine tune threshold estimates, and other aspects may simply aggregate total signal impairments and use this aggregated figure to determine various thresholds.

In other cases, which may be in addition or in the alternative to the above cases, the signal impairment adjustment factor(s) 230 may be based on other events or information that can provide an indication of a level of signaling or expected signaling in a sub-channel, and hence result increased noise. For example, such other events or information may include, but are not limited to, Semi-Persistent Scheduling (SPS) information, Physical Sidelink Control Channel (PSCCH) decoding information, or Physical Sidelink Shared Channel (PSSCH) decoding information. One or any combination of such other events or information may be correlated to a respective value of the one or more signal impairment adjustment factors 230. For example, PSCCH or PSSCH can be decoded (both SPS and event-driven), and the corresponding sub-channel S-RSSI and leakage from the sub-channel to other sub-channels may be considered for the adjustment of the CBR threshold 226, e.g., threshS-RSSI-CBR. Further, for example, predicted SPS SF/sub-channels can be considered for the corresponding S-RSSI and leakage from the sub-channel to other sub-channels may be considered for the adjustment of the CBR threshold, e.g., threshS-RSSI-CBR 226. In this SPS case, for instance, for a 10 millisecond (ms) transmission that occurs periodically in a given sub-channel, by decoding the SPS the UE can determine that the SPS occurs every 10 ms, and can thus predict that the sub-channel will be busy based on the known periodicity.

As noted above, in some cases, the signal impairment adjustment factors 230 may be one or more threshold adjustment values representing a numeric value to be added, subtracted, multiplied, or divided from the CBR threshold 226, e.g., threshS-RSSI-CBR, to adjust for signal noise 218.

For example, the CBR threshold 226 may be biased +/−X, in which X is the threshold adjustment value corresponding to the signal noise 218 attributable to various signal impacts. The size of the threshold adjustment value may depend on the type of signal impairment adjustment factor 230 identified by the STA 104 for a particular sub-channel. For example, signal impairment adjustment factors 230 associated with DC power interference may have an associated threshold adjustment value $X_1$ and a signal impairment adjustment factor associated with signal image may have a bias of $X_2$, and so on, such that the threshold adjustment value may be a sum of individual adjustments values (e.g., $X_1+X_2$ . . . ) of different types of impairments associated with different levels of the measured max S-RSSI 228.

It should be understood, however, that besides being an adjustment value applied to a measured value, the signal impairment adjustment factor 230 may take other forms for adjusting CBR threshold 226. For instance, signal impairment adjustment factor 230 may be directly correlated to one of a plurality of values of the CBR threshold 226 based on the amount of measured S-RSSI signaling in a channel. An example of such a direct correlation may be a direct mapping of a measured S-RSSI to one of a plurality of values of the CBR threshold 226. For example, if the maximum of the S-RSSI measurements is relatively high (e.g., over a high S-RSSI measurement threshold), then use a relatively high adjusted CBR threshold. Conversely, for example, if the maximum of the S-RSSI measurements is relatively low (e.g., below a low S-RSSI measurement threshold), then use a relatively low adjusted CBR threshold.

Figure 2B:
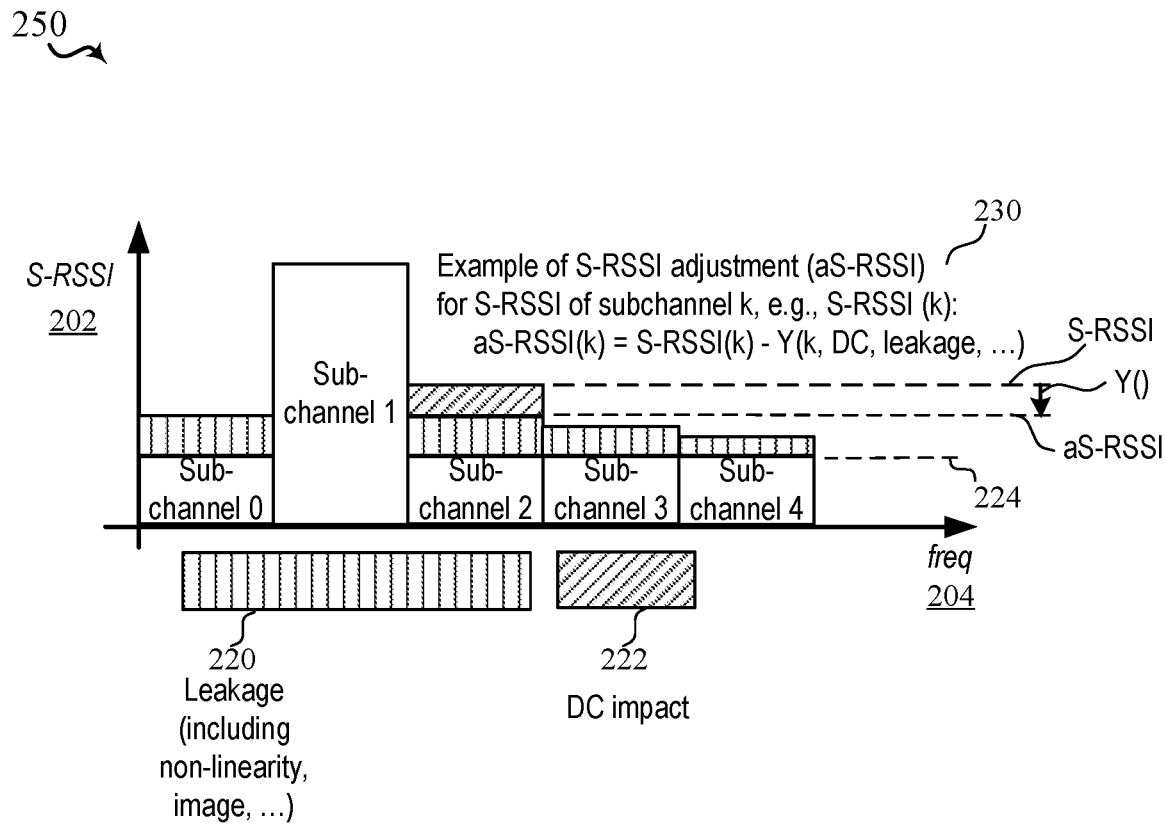
FIG. 2B is a graph of noise impact on example S-RSSI strength measurements across sub-channel frequencies, and corresponding S-RSSI adjustments used to calculate a dynamic CBR threshold, in accordance with aspects of the present disclosure.

Referring to FIG. 2B, an example of actual measurements 250 of S-RSSI strength 202 across sub-channel frequencies 204 are used by the selection and control component 198 to make S-RSSI adjustments for use in calculating a more accurate CBR to account for noise in the actual S-RSSI measurements. The S-RSSI measurements may be performed by a vehicle or other STA 104 (e.g., wireless station) described with reference to FIG. 1 above. This case is an alternative to adjusting the CBR threshold 226, as discussed above with respect to FIG. 2A, but achieves the same and/or similar results.

In this case, the selection and control component 198 may adjust the value of the measured S-RSSI in each sub-channel by a corresponding signal impairment adjustment factor 230, which may be a value that corresponds to signal noise 218 in each sub-channel. For example, the signal impairment adjustment factor 230 may be an S-RSSI signal adjustment value, which may be based on a rule or mathematical function applied to the measured S-RSSI of each sub-channel. For example, in one implementation, the S-RSSI signal adjustment value may reduce the measured S-RSSI by partially or wholly removing the contributions of signal noise 218 to the measured S-RSSI. For instance, the signal noise 218 such as, but not limited to, the DC power interference 222 and the signal leakage 220, may be factored into the adjustment of the actual S-RSSI measurements. In one example implementation, the adjusted S-RSSI ("aS-RSSI") may be represented by the following formula: aS-RSSI(n, k)=F(S-RSSI(n, k), signal impairment adjustment factor 230), wherein n corresponds to a number of the subframe under consideration, k is the sub-channel for which the S-RSSI is measured, and the function F( ) may be any function that takes into account the actual S-RSSI measurement and the corresponding signal impairment adjustment factor 230 for the respective sub-frame and sub-channel. In various aspects, the function F( ) may be linear or non-linear and may depend upon the signal impairment adjustment factors.

By way of example, the function F( ) used by the selection and control component 198 in calculating the aS-RSSI may include subtracting all or part of the signal noise 218 from the measured S-RSSI. For instance, in one implementation, aS-RSSI(n, k)=S-RSSI(n, k)−Y(k, DC, leakage, etc.) for sub-channels impacted by signal noise 218. In this case, Y( ) may be a function or variable (e.g., having a value between 0 and 1) applied to a sum of the signal noise 218, or may be a different function or variable applied to different types of signal noise 218. Thus, the value of the aS-RSSI may reduce the measure S-RSSI for a sub-channel k by any amount, for example, all the way down to a given noise floor, e.g., the ideal noise floor 224.

In some aspects, the selection and control component 198 may estimate the value of the adjusted S-RSSI, denoted as aS-RSSI, based on, or including, a previous history of received periodic SPS S-RSSI. For example, the estimation may be based on a mathematical formula applied to a set of samples of previously received SPS S-RSSI samples. For example, in the case of a 100 ms SRS period, the selection and control component 198 may estimate the value of S-RSSI (n, k) based on a set of SPS S-RSSI (n−m*100, k), m=1, 2, . . . , where "n−m*100" indicates previous m-th SPS period of 100 ms relative to a current subframe index n and obtain an SPS S-RSSI sample, and where k is the sub-channel from which the sample is taken. The number of samples can be varying depending on how many samples are desired and/or depending on the value of the SRS period. For instance, if just one sample is used, then one SPS S-RSSI sample from the prior 100 ms period (e.g., n−100) is used to modify the current S-RSSI. Similarly, if two samples are used, then a first SPS S-RSSI sample from the first prior 100 ms period (e.g., n−100) and a second SPS S-RSSI sample from the second prior 00 ms period (e.g., n−200) is used to modify the current S-RSSI, and so on. For example, if the adjusted S-RSSI is based on an average, and 10 samples are used, then the adjusted S-RSSI will be adjusted by using the average of the 10 samples going back 10 SPS periods. Suitable values of the SRS period may include, but are not limited to, 20 ms, 50 ms, 100 ms, 200 ms, and 1000 ms. Additionally, in some implementations, the used number of samples can also vary for a given SRS period, for example between 5-15 for a 100 ms periodicity.

In some aspects, the selection and control component 198 may estimate the value of S-RSSI (n, k) based on, or including, retransmission S-RSSI measurements. In some implementations, for a retransmission, at sub-frame (n−SFgap), the UE may receive the retransmission information at sub-frame n, and thus S-RSSI at sub-frame n may use this information.

In any case, selection and control component 198 then operates to compare the adjusted S-RSSI, aS-RSSI, to a given CBR threshold 226 in order to determine the CBR for a given sub-channel. For instance, in calculating the CBR, whether a sub-channel is busy or not busy may be determined by comparing the adjusted S-RSSI, e.g., aS-RSSI, to the threshS-RSSI-CBR, and if the adjusted S-RSSI is above the threshS-RSSI-CBR then the sub-channel may be considered busy, and if the adjusted S-RSSI is equal to or below the threshS-RSSI-CBR then the sub-channel may be considered not busy. Based on the CBR, the selection and control component 198 then operates to perform resource selection and/or congestion control.

In various aspects, the techniques described with reference to FIG. 2A and FIG. 2B may be combined. One or both aspects may be used to detect and select sub-channels and/or to support future transmissions. More specifically, sub-channels with desirable adjusted S-RSSI, or those that fall within the CBR threshold, may be selected to support transmission/reception (Tx/Rx) between V2X devices.

Figure 3:
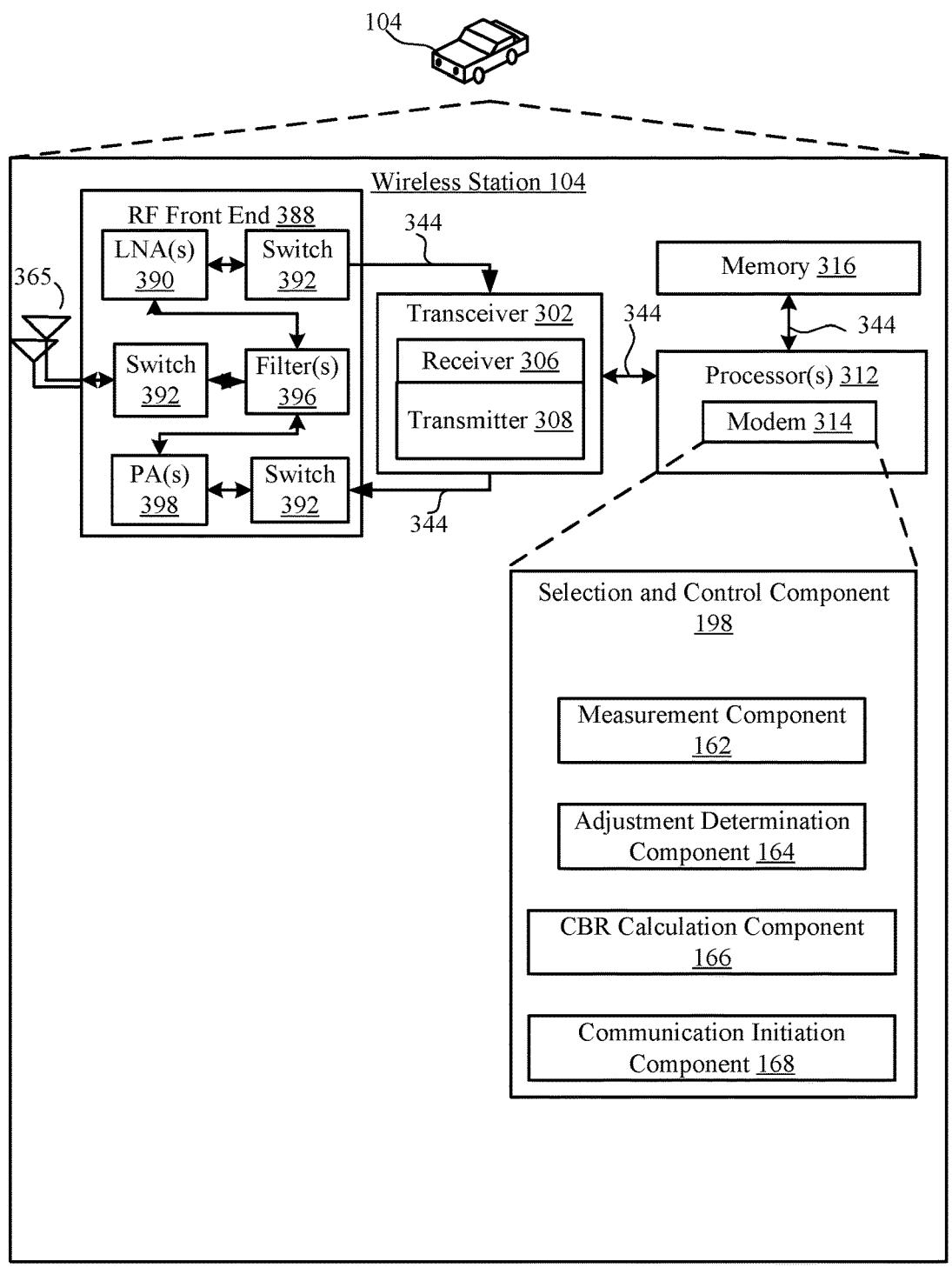
FIG. 3 is a schematic diagram of an example of a device including an aspect of an vehicle that may implement various aspects of the present disclosure.

Referring to FIG. 3, an example of STA 104 may include various components and subcomponents for implementing one or more methods (e.g., methods 400) described herein in accordance with various aspects of the present disclosure. The STA 104 may be an example of a vehicle implementing V2X communications. As discussed above, the STA 104 may take S-RSSI measurements of sub-channels of a communication channel using the measurement component 162. The STA 104 may determine an adjustment value, e.g., signal impairment adjustment factor 230, based on the measured S-RSSI and using the adjustment determination component 164. The CBR calculation component 166 of the STA 104 may calculate or otherwise determine the CBR for a sub-channel of interest by taking into account signal impairment adjustment factor 230, e.g., either a CBR threshold adjustment or a measured S-RSSI adjustment, which modifies the CBR based on the impact of signal noise 218. Communication using the channel of interest may be initiated using the communication initiation component 168, such as by performing a resource selection to select the sub-channel, or to perform congestion control to move transmissions onto less busy sub-channels. Each of components 162, 164, 166, and 168 may be a sub-component of the selection and control component 198 as discussed with reference to FIG. 1 above.

One example of an implementation of STA 104 may include a variety of components, some of which have already been described above, but including components such as one or more processors 312, memory 316 and transceiver 302 in communication via one or more buses 344, which may operate in conjunction with the selection and control component 198 to enable one or more of the functions described herein related to including one or more methods of the present disclosure. Further, the one or more processors 312, modem 314, memory 316, transceiver 302, RF front end 388 and one or more antennas 365, may be configured to support voice and/or data calls (simultaneously or non-simultaneously) in one or more radio access technologies.

In an aspect, the one or more processors 312 can include a modem 314 that uses one or more modem processors. The various functions related to the selection and control component 198 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with selection and control component 198 may be performed by transceiver 302.

Also, memory 316 may be configured to store data used herein and/or local versions of applications or selection and control component 198 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the selection and control component 198 and/or one or more of the subcomponents of the selection and control component 198, and/or data associated therewith, when STA 104 is operating at least one processor 312 to execute the selection and control component 198 and/or one or more of the subcomponents of the selection and control component 198.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one STA 104 or base stations 102. Additionally, receiver 306 may process such received signals, and also may obtain measurements of the signals, such as, but not limited to, Ec/Io, SNR, RSRP, S-RSSI, RSSI, etc. Transmitter 308 may include hardware, firmware, and/or software code executable by a processor for transmitting data, the code comprising instructions and being stored in a memory (e.g., computer-readable medium). A suitable example of transceiver 302 may including, but is not limited to, an RF transmitter.

Moreover, in an aspect, STA 104 may include RF front end 388, which may operate in communication with one or more antennas 365 and transceiver 302 for receiving and transmitting radio transmissions, for example, wireless communications transmitted by at least one other STA 104 or wireless transmissions transmitted by other STA 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 688 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that STA 104 can communicate with, for example, one or more other STAs 104 or one or more cells associated with one or more AP 105. In an aspect, for example, modem 314 can configure transceiver 302 to operate at a specified frequency and power level based on the UE configuration of the STA 104 and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 414 can be multimode and be configured to support multiple operating networks and communications protocols. In an aspect, modem 314 can control one or more components of STA 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on configuration information associated with STA 104 as provided by the network during cell selection and/or cell reselection.

Figure 4:
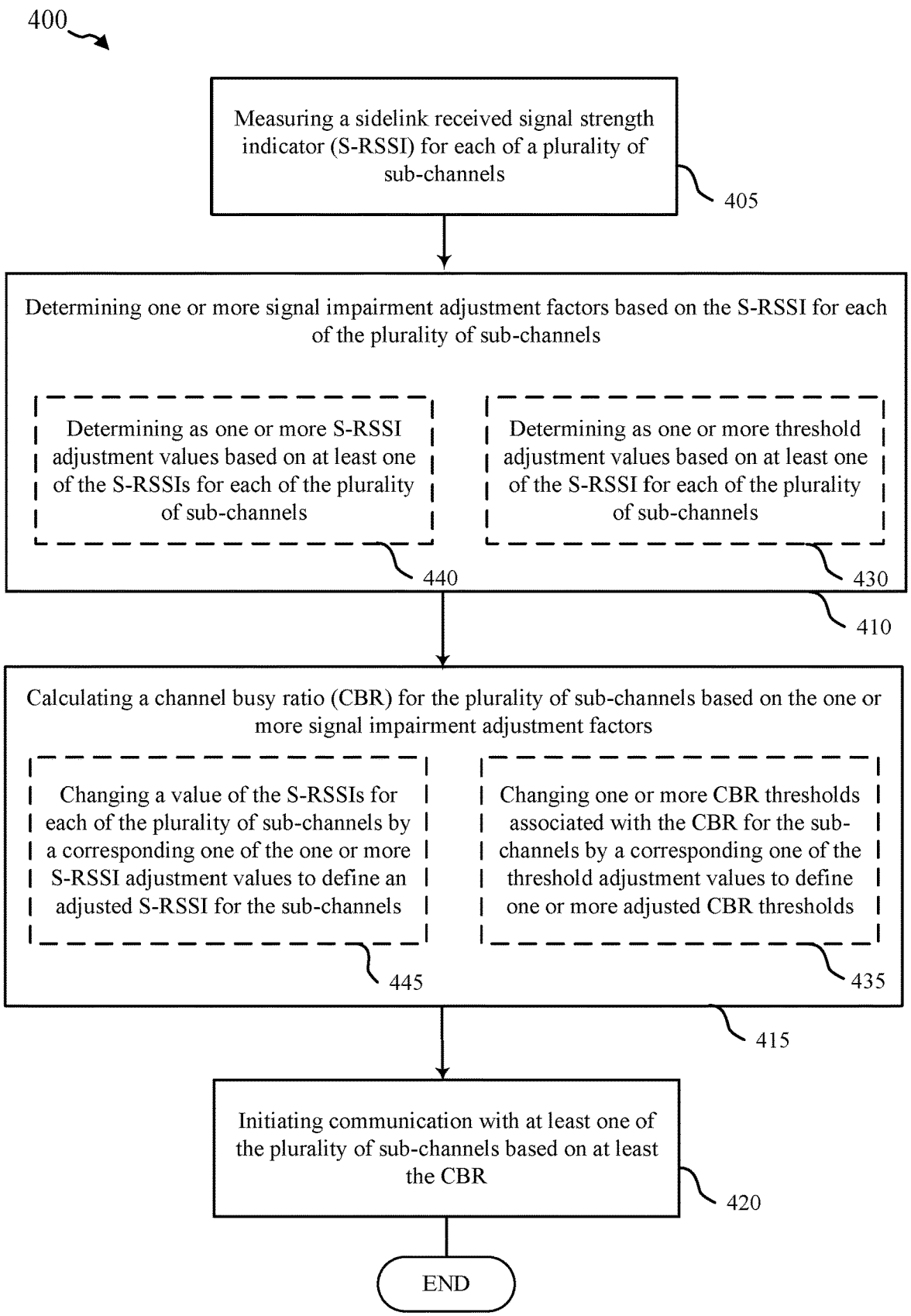
FIG. 4 illustrates one example of a flowchart that shows aspects of congestion control and sub-channel selection in accordance with various aspects of the present disclosure.

Referring to FIG. 4, an example of a method 400 of controlling wireless communication implemented by a wireless station (e.g., STA 104), in accordance with aspects of the present disclosure. For clarity, the method 400 is described below with reference to STA 104 and/or one or more of the components of the STA 104 as described above in FIGS. 1-3.

At block 405, the method 400 may include measuring a sidelink received signal strength indicator (S-RSSI) for each of a plurality of sub-channels. For example, in an aspect, the selection and control component 198 may be executed to measure a sidelink received signal strength indicator (S-RSSI), e.g., S-RSSI 200 or 250, for each of a plurality of sub-channels 204. More specifically, in an implementation, the measurement component 162 may use receiver 306 to obtain S-RSSI measurements for each sub-channel of a sub-frame of data communications between two STAs implementing V2X communications. Further details of the actions of block 405 are described above with respect to FIGS. 2A, 2B, and 3.

At block 410, the method 400 may include determining one or more signal impairment adjustment factors based on the S-RSSI for each of the plurality of sub-channels. For example, in an aspect, selection and control component 198 may execute adjustment determination component 164 to determine one or more signal impairment adjustment factors based on the S-RSSI, e.g., S-RSSI 202 or 250, for each of the plurality of sub-channels 204. The selection and control component 198 may compare the measured S-RSSIs against known activity for sub-channels 204 to determine whether some kind of signal impairment is effecting the signal strength, and may further determine what manner of signal impairment adjustment factor is active. Additionally, determining one or more signal impairment adjustment factors may include determining one or more threshold adjustment factors, e.g., to adjust one or more CBR thresholds 226, or determining one or more S-RSSI adjustment factors, e.g., to adjust one or more measured S-RSSI values.

For example, in one aspect, at block 430 the method 400 may include determining the one or more signal impairment adjustment factors as one or more threshold adjustment values based on at least one of the S-RSSI for each of the plurality of sub-channels. For example, in an aspect, the selection and control component 198 may execute the adjustment determination component 164 to determine the one or more signal impairment adjustment factors as one or more threshold adjustment values based on at least one of the S-RSSI 202 or 250 for each of the plurality of sub-channels 204. For instance, in one implementation, the selection and control component 198 determines the one or more signal impairment adjustment factors as one or more threshold adjustment values based on at least one of the S-RSSI for each of the plurality of sub-channels. These one or more threshold adjustment values may be a single threshold adjustment value that is applied to a single CBR threshold used for all sub-channels in calculating a CBR, or respective sub-channel-specific threshold adjustment values that are applied to respective sub-channel-specific CBR thresholds for respective ones of the sub-channels, e.g., for calculating a CBR for each sub-channel. Further details of the actions of blocks 410 and 430 are described above with respect to FIGS. 2A, 2B, and 3.

Further, for example in another aspect, at block 440 the method 400 may include determining the one or more signal impairment adjustment factors as one or more S-RSSI adjustment values based on at least one of the S-RSSIs for each of the plurality of sub-channels. For example, in an aspect, the selection and control component 198 may execute the adjustment determination component 164 to determine the one or more signal impairment adjustment factors as one or more S-RSSI adjustment values based on at least one of the S-RSSIs 202 for each of the plurality of sub-channels 204. For example, in one implementation, the selection and control component 198 determines the one or more signal impairment adjustment factors as one or more S-RSSI adjustment values based on at least one of the S-RSSIs for each of the plurality of sub-channels. These one or more S-RSSI adjustment values may be a single S-RSSI adjustment value that is applied to each measured S-RSSI for each sub-channel, or respective sub-channel-specific S-RSSI adjustment values that are applied to the corresponding measured S-RSSI value for each of the sub-channels, e.g., for calculating a CBR for each sub-channel. Further details of the actions of blocks 410 and 430 are described above with respect to FIGS. 2A, 2B, and 3.

At block 415, the method 400 may include calculating a channel busy ratio (CBR) for the plurality of sub-channels based on the one or more signal impairment adjustment factors. For example, in an aspect, the selection and control component 198 may execute the CBR calculation component 166 to calculate a CBR for the plurality of sub-channels 204 based on the one or more signal impairment adjustment factors. That is, the one or more signal adjustment factors may be used in the calculation of an adjusted CBR threshold and/or an adjusted S-RSSI used in calculating the CBR.

In one aspect, at block 435, the method 400 may include calculating the CBR for the plurality of sub-channels based on changing one or more CBR thresholds for the plurality of sub-channels by a corresponding one of the one or more threshold adjustment values to define one or more adjusted CBR thresholds. For example, in an aspect, the selection and control component 198 may execute the CBR calculation component 166 to calculate the CBR for the plurality of sub-channels 204 based on changing one or more CBR thresholds for the plurality of sub-channels by a corresponding one of the one or more threshold adjustment values to define one or more adjusted CBR thresholds. For instance, in the implementation where the one or more signal impairment adjustment factors 230 are one or more threshold adjustment values, the selection and control component 198 calculates the CBR by comparing the measured S-RSSI for each sub-channel to the single, dynamically-determined CBR threshold 226, or calculates respective sub-channel-specific dynamically-determined CBR thresholds 226 for the respective sub-channels and correspondingly calculates the resulting CBR. Thus, the CBR threshold used in determined whether a sub-channel is busy or not when calculating the CBR may be adjusted to more accurately reflect the Tx/Rx load that a channel can handle. Further details of the actions of blocks 415 and 435 are described above with respect to FIGS. 2A, 2B, and 3.

In another aspect, at block 445, the method 400 may include calculating the CBR for the plurality of sub-channels based on changing a value of the S-RSSIs for each of the plurality of sub-channels by a corresponding one of the one or more S-RSSI adjustment values to define an adjusted S-RSSI for each of the plurality of sub-channels. For example, in an aspect, the selection and control component 198 may execute the CBR calculation component 166 to calculate the CBR for the plurality of sub-channels 204 based on changing a value of the S-RSSIs for each of the plurality of sub-channels 204 by a corresponding one of the one or more S-RSSI adjustment values to define an adjusted S-RSSI for each of the plurality of sub-channels 204. For instance, in the implementation where the one or more signal impairment adjustment factors 230 are one or more S-RSSI adjustment values, the selection and control component 198 calculates the CBR by comparing an adjusted S-RSSI for each sub-channel to a single, channel-wide CBR threshold 226 or to a respective sub-channel-specific CBR threshold 226, and correspondingly calculating the CBR based on the results. As discussed above, the adjusted S-RSSI values may be the actual measured S-RSSI values modified by a function, e.g., F( ) and/or Y( ), that takes into account the impact of signal noise 218. For instance, in one example, the one or more S-RSSI adjustment values may be directly removed or subtracted or added to the S-RSSI measurements, prior to calculation of a CBR for the sub-channel. Further details of the actions of blocks 415 and 445 are described above with respect to FIGS. 2A, 2B, and 3.

At block 420, the method 400 may include initiating communication with at least one of the plurality of sub-channels based on at least the CBR. For example, in an aspect, the selection and control component 198 may execute the communication initiation component 168 to initiate communication with at least one of the plurality of sub-channels 204 based on at least the CBR. For instance, in one implementation, the selection and control component 198 may initiate communication with at least one of the plurality of sub-channels by performing a resource selection or by performing a congestion control procedure with the at least one of the plurality of sub-channels. The selected one of the plurality of sub-channels may be, for example, the sub-channel having a minimum or one of the minimum measured S-RSSIs. For example, the STA 104 may select a plurality of candidate sub-channels, e.g., sub-channels having a measured S-RSSI that are a minimum number or percentage of all the measured S-RSSIs, and then the STA 104 may randomly select one sub-channel from the set, e.g., to spread out resource selection among the set of sub-channels as other STAs that have packets to transmit will be going through a similar procedure.

In various aspects, the selection and control component 198 and the subcomponents 162-168 of the selection and control component 198 may implement additional V2X communication operations using CBR thresholds and/or S-RSSI measurements adjusted for signal noise.

In some aspects, the selection and control component 198 may be executed such that determining the one or more signal impairment adjustment factors 230 as in block 410 may include the adjustment determination component 164 determining one or more threshold adjustment values based on at least one of the S-RSSI, e.g., S-RSSI 202 for each of the plurality of sub-channels 204, changing one or more CBR thresholds 226 used by the CBR calculation component 166 in calculating the CBR for the plurality of sub-channels 204 by a corresponding one of the one or more threshold adjustment values to define one or more adjusted CBR thresholds 226, such that calculating the CBR for the plurality of sub-channels 204 comprises using the one or more adjusted CBR thresholds 226, and such that initiating communication by the communication initiation component 168 is further based on at least the CBR calculated using the one or more adjusted CBR thresholds.

In such aspects, calculating the CBR, by the CBR calculation component 166, for each of the plurality of sub-channels 204 may include comparing the S-RSSI 202 for each of the of the plurality of sub-channels 204 to the corresponding one of the one or more adjusted CBR thresholds 226 to determine if the respective sub-channel is busy or not busy, and initiating communication, by the communication initiation component 168, on at least one of the plurality of sub-channels 204 based on the corresponding one of the one or more adjusted CBR thresholds 226.

In other such aspects, changing the one or more CBR thresholds 226, by the CBR calculation component 166, may include changing a single CBR threshold 226 that used to calculate the CBR across all of the plurality of sub-channels 204.

In other such aspects, changing the one or more CBR thresholds 226, by the CBR calculation component 166, may include changing a plurality of CBR thresholds 226, each corresponding to one of the plurality of sub-channels.

In other such aspects, determining the one or more threshold adjustment values, by the adjustment determination component 164, based on at least one of the S-RSSI for each of the plurality of sub-channels 204 may include determining whether at least one of the measured S-RSSIs 202 satisfy a measurement threshold, and increasing or decreasing the one or more CBR thresholds 226 by the one or more threshold adjustment values based on whether the at least one of the measured S-RSSIs 202 satisfy a measurement threshold.

In another such aspects, determining the one or more threshold adjustment values, by the adjustment determination component 164, based on at least one of the S-RSSI for each of the plurality of sub-channels 204 may include determining a measured maximum one of the S-RSSIs 202, determining a unit value of the one or more threshold adjustment values based on the maximum one of the S-RSSIs, and increasing or decreasing the one or more CBR thresholds by the unit value of the one or more threshold adjustment values.

In other such aspects, determining the one or more threshold adjustment values, by the adjustment determination component 164, based on at least one of the S-RSSI for each of the plurality of sub-channels may include calculating a statistic of the S-RSSIs 202, and changing the CBR threshold based, at least in part, on the statistic. For example, the statistic may include, but it not limited to, a maximum, an average, an association or mapping of a measured value to a statistic value, a look-up table, a biasing (e.g., by a value corresponding to an impairment, e.g., DC or leakage), a linear or non-linear function, PSCCH and/or PSSCH decoding information, or another other mathematical calculation or function.

In other such aspects, the CBR threshold 226 for each of the plurality of sub-channels is defined by a function CBR threshold=max S-RSSI+/−X, such that the max S-RSSI 228 is a maximum one of the S-RSSIs 202 and wherein X is the one or more signal impairment adjustment factors 230.

In other such aspects, the one or more threshold adjustment values may be determined, by the adjustment determination component 164, based on one or more of Semi-Persistent Scheduling (SPS) information, Physical Sidelink Control Channel (PSCCH) decoding information, or Physical Sidelink Shared Channel (PSSCH) decoding information.

Other such aspects may further include the selection and control component 198 being executed to change a value of the S-RSSIs 202 for each of the plurality of sub-channels 204 by a corresponding one of the one or more S-RSSI adjustment values to define an adjusted S-RSSI for each of the plurality of sub-channels, such that calculating the CBR, by the CBR calculation component 166, may include using the respective adjusted S-RSSI 250 for each of the plurality of sub-channels 204, and such that initiating communication, by the communication initiation component 168, may be further based on the CBR calculated using the adjusted S-RSSI 250 for each of the plurality of sub-channels.

Some aspects may further include determining one or more signal impairment adjustment factors 230, by the adjustment determination component 164, by identifying one or more of the S-RSSI for each of the plurality of sub-channels 204 as including measurement noise from one or more of DC power, signal interference, signal image, or signal leakage.

In some aspects, determining, by the adjustment determination component 164, the one or more signal impairment adjustment factors 230 may include determining one or more S-RSSI adjustment values based on at least one of the S-RSSIs 202 for each of the plurality of sub-channels 204, changing a value of the S-RSSIs 202 for each of the plurality of sub-channels 204 by a corresponding one of the one or more S-RSSI adjustment values to define an adjusted S-RSSI 250 for each of the plurality of sub-channels 204, such that calculating the CBR, by the CBR calculation component 166, may include using the adjusted S-RSSI 250 for each of the plurality of sub-channels 204, and such that initiating communication, by the communication initiation component 168, may be based on the CBR calculated using the adjusted S-RSSI for each of the plurality of sub-channels.

Such aspects may further include the selection and control component 198 comparing the adjusted S-RSSI 250 for each of the of the plurality of sub-channels 204 to a corresponding CBR threshold 226 for each of the plurality of sub-channels 204 to define the CBR for the of the plurality of sub-channels 204, and such that initiating communication, by the communication initiation component 168, may include initiating based on the CBR determined based on the adjusted S-RSSI 250 for each of the of the plurality of sub-channels 204.

In other such aspects, changing the value of the S-RSSIs 202 for each of the plurality of sub-channels 204 to define the adjusted S-RSSI 250 for each of the plurality of sub-channels 204 may include applying an adjustment function that calculates the one or more S-RSSI adjustment values based on identifying one or more of the S-RSSI 202 for each of the plurality of sub-channels as including signal noise. In such aspects, applying of the adjustment function includes removing signal noise.

In other such aspects, changing one or more CBR thresholds 226 for each of the plurality of sub-channels includes changing by a corresponding one of the one or more threshold adjustment values to define one or more adjusted CBR thresholds 226, and initiating communication, by the communication initiation component 168, may be based on the one or more adjusted CBR thresholds 226.

Some aspects may further include the selection and control component 198 identifying a set of sub-channels from the plurality of sub-channels 204 having minimum S-RSSIs, and initializing communication with a randomly selected one of the set of sub-channels by the communication initiation component 168. For example, when the STA 104 has packets to transmit, the STA 104 may select a plurality of candidate sub-channels, e.g., sub-channels having a measured S-RSSI that are a minimum number or percentage of all the measured S-RSSIs, and then the STA 104 may randomly select one sub-channel from the set, e.g., to spread out resource selection among the set of sub-channels as other STAs that have packets to transmit will be going through a similar procedure.

In some aspects, initiating communication, by the communication initiation component 168, with at least one of the plurality of sub-channels 204 may include performing a resource selection or performing a congestion control procedure with the at least one of the plurality of sub-channels.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of controlling wireless communications, comprising:
    measuring a sidelink received signal strength indicator (S-RSSI) for each of a plurality of sub-channels;
    changing a value of at least one S-RSSI for at least one sub-channel of the plurality of sub-channels based, at least in part, on at least one S-RSSI adjustment value for the at least one sub-channel, the at least one S-RSSI adjustment value being based on, at least in part, a signal noise corresponding to the at least one sub-channel;
    determining one or more signal impairment adjustment factors based on the S-RSSI for each of the plurality of sub-channels;
    calculating a channel busy ratio (CBR) for each of the plurality of sub-channels based on the one or more signal impairment adjustment factors for each of the plurality of sub-channels; and
    initiating communication via at least the at least one sub-channel of the plurality of sub-channels based, at least in part, on at least the CBR for each of the plurality of sub-channels,
    wherein determining one or more signal impairment adjustment factors further comprises identifying one or more of the S-RSSI for each of the plurality of sub-channels as including measurement noise from one or more of DC power, signal interference, signal image, or signal leakage.

2. The method of claim 1, further comprising:
    wherein determining the one or more signal impairment adjustment factors comprises determining one or more threshold adjustment values based on at least one of the S-RSSI for each of the plurality of sub-channels;
    changing one or more CBR thresholds used in calculating the CBR for each of the plurality of sub-channels by a corresponding one of the one or more threshold adjustment values to define one or more adjusted CBR thresholds;
    wherein calculating the CBR further comprises using the one or more adjusted CBR thresholds; and
    wherein initiating communication is further based on the CBR calculated using the one or more adjusted CBR thresholds.

3. The method of claim 2,
    wherein calculating the CBR further comprises comparing the S-RSSI for each of the of the plurality of sub-channels to the corresponding one of the one or more adjusted CBR thresholds to determine if the respective sub-channel is busy or not busy; and
    wherein initiating communication further comprises initiating based on the CBR determined based on the corresponding one of the one or more adjusted CBR thresholds.

4. The method of claim 2, wherein changing the one or more CBR thresholds comprises changing a single CBR threshold that is used to calculate the CBR across all of the plurality of sub-channels.

5. The method of claim 2, wherein changing the one or more CBR thresholds comprises changing a plurality of CBR thresholds, each corresponding to one of the plurality of sub-channels.

6. The method of claim 2, wherein determining the one or more threshold adjustment values based on at least one of the S-RSSI for each of the plurality of sub-channels comprises:
    determining whether at least one of the measured S-RSSIs satisfy a measurement threshold; and
    increasing or decreasing the one or more CBR thresholds by the one or more threshold adjustment values based on whether the at least one of the measured S-RSSIs satisfy a measurement threshold.

7. The method of claim 2, wherein determining the one or more threshold adjustment values based on at least one of the S-RSSI for each of the plurality of sub-channels comprises:
  determining a measured maximum one of the S-RSSIs;
  determining a unit value of the one or more threshold adjustment values based on the maximum one of the S-RSSIs; and
  increasing or decreasing the one or more CBR thresholds by the unit value of the one or more threshold adjustment values.

8. The method of claim 2, wherein determining the one or more threshold adjustment values based on at least one of the S-RSSI for each of the plurality of sub-channels comprises:
  calculating a statistic of the S-RSSIs; and
  changing the CBR threshold based, at least in part, on the statistic.

9. The method of claim 2, wherein the CBR threshold for each of the plurality of sub-channels is defined by a function:

CBR threshold=max S-RSSI+/−X, wherein the max S-RSSI is a maximum one of the S-RSSIs and wherein the X is the one or more signal impairment adjustment factors.

10. The method of claim 2, wherein the one or more threshold adjustment values are determined based on one or more of Semi-Persistent Scheduling (SPS) information, Physical Sidelink Control Channel (PSCCH) decoding information, or Physical Sidelink Shared Channel (PSSCH) decoding information.

11. The method of claim 1, further comprising:
  comparing the S-RSSI for each of the of the plurality of sub-channels to a corresponding CBR threshold for each of the plurality of sub-channels to determine if the respective sub-channel is busy or not busy; and
  wherein initiating the communication via the at least one of the plurality of sub-channels based on at least the CBR further comprises initiating communication via the at least one sub-channel based at least in part a determination that the at least one sub-channel is not busy.

12. The method of claim 1, wherein initiating communication via the at least one sub-channel further comprises performing a resource selection or performing a congestion control procedure for the at least one sub-channel.

13. An apparatus for controlling wireless communications, comprising:
  a transceiver;
  a memory; and
  a processor coupled with the transceiver and the memory and configured to perform operations comprising:
    measure a sidelink received signal strength indicator (S-RSSI) for each of a plurality of sub-channels;
    change a value of at least one S-RSSI for at least one sub-channel of the plurality of sub-channels based, at least in part, on at least one S-RSSI adjustment value for the at least one sub-channel, the at least one S-RSSI adjustment value being based on, at least in part, a signal noise corresponding to the at least one sub-channel;
    determine one or more signal impairment adjustment factors based on the S-RSSI for each of the plurality of sub-channels;
    calculate a channel busy ratio (CBR) for each of the plurality of sub-channels based on the one or more signal impairment adjustment factors for each of the plurality of sub-channels; and
    initiate communication by the transceiver via at least the at least one sub-channel of the plurality of sub-channels based, at least in part, on at least the CBR for each of the plurality of sub-channels,
  wherein the processor is configured to determine the one or more signal impairment adjustment factors by identifying one or more of the S-RSSI for each of the plurality of sub-channels as including measurement noise from one or more of DC power, signal interference, signal image, or signal leakage.

14. The apparatus of claim 13, wherein the processor is configured to determine the one or more signal impairment adjustment factors by determining one or more threshold adjustment values based on at least one of the S-RSSI for each of the plurality of sub-channels; and
  the processor is further configured to change one or more CBR thresholds used in calculating the CBR for each of the plurality of sub-channels by a corresponding one of the one or more threshold adjustment values to define one or more adjusted CBR thresholds;
  wherein the processor is configured to calculate the CBR using the one or more adjusted CBR thresholds; and
  wherein the processor is configured to initiate the communication based on the CBR calculated using the one or more adjusted CBR thresholds.

15. The apparatus of claim 14,
  wherein the processor is configured to calculate the CBR by comparing the S-RSSI for each of the of the plurality of sub-channels to a corresponding one of the one or more adjusted CBR thresholds to determine if the respective sub-channel is busy or not busy; and
  wherein the processor is configured to initiate the communication based on the CBR determined based on the corresponding one of the one or more adjusted CBR thresholds.

16. The apparatus of claim 14, wherein the processor is configured to change the one or more CBR thresholds by changing a single CBR threshold that is used to calculate the CBR across all of the plurality of sub-channels.

17. The apparatus of claim 14, wherein the processor is configured to change the one or more CBR thresholds by changing a plurality of CBR thresholds, each corresponding to one of the plurality of sub-channels.

18. The apparatus of claim 14, wherein the processor is configured to determine the one or more threshold adjustment values based on at least one of the S-RSSI for each of the plurality of sub-channels by:
  determining whether at least one of the measured S-RSSIs satisfy a measurement threshold; and
  increasing or decreasing the one or more CBR thresholds by the one or more threshold adjustment values based on whether the at least one of the measured S-RSSIs satisfy a measurement threshold.

19. The apparatus of claim 14, wherein the processor is configured to determine the one or more threshold adjustment values based on at least one of the S-RSSI for each of the plurality of sub-channels by:
  determining a measured maximum one of the S-RSSIs;
  determining a unit value of the one or more threshold adjustment values based on the maximum one of the S-RSSIs; and
  increasing or decreasing the one or more CBR thresholds by the unit value of the one or more threshold adjustment values.

20. The apparatus of claim 14, wherein the processor is configured to determine the one or more threshold adjustment values based on at least one of the S-RSSI for each of the plurality of sub-channels by:
calculating a statistic of the S-RSSIs; and
changing the CBR threshold based, at least in part, on the statistic.

21. The apparatus of claim 14, wherein the CBR threshold for each of the plurality of sub-channels is defined by a function:

CBR threshold=max S-RSSI+/−X, wherein the max S-RSSI is a maximum one of the S-RSSIs and wherein the X is the one or more signal impairment adjustment factors.

22. The apparatus of claim 14, wherein the one or more threshold adjustment values are determined based on one or more of Semi-Persistent Scheduling (SPS) information, Physical Sidelink Control Channel (PSCCH) decoding information, or Physical Sidelink Shared Channel (PSSCH) decoding information.

23. The apparatus of claim 13, wherein the processor is further configured to:
compare the S-RSSI for each of the of the plurality of sub-channels to a corresponding CBR threshold for each of the plurality of sub-channels to determine if the respective sub-channel is busy or not busy; and
wherein the processor is configured to initiate the communication via the at least one of the plurality of sub-channels based on at least the CBR based at least in part a determination that the at least one sub-channel is not busy.

24. The apparatus of claim 13, wherein the processor is configured to change the value of the S-RSSIs for each of the plurality of sub-channels to define the adjusted S-RSSI for each of the plurality of sub-channels by applying an adjustment function that calculates the one or more S-RSSI adjustment values based on identifying one or more of the S-RSSI for each of the plurality of sub-channels as including signal noise.

25. The apparatus of claim 13, wherein the processor is configured to initiate the communication via the at least one sub-channel based, at least in part, on one or more results of a resource selection procedure or a congestion control procedure performed of the at least one sub-channel.

26. An apparatus for controlling wireless communications, comprising:
means for measuring a sidelink received signal strength indicator (S-RSSI) for each of a plurality of sub-channels;
means for changing a value of at least one S-RSSI for at least one sub-channel of the plurality of sub-channels based, at least in part, on at least one S-RSSI adjustment value for the at least one sub-channel, the at least one S-RSSI adjustment value being based on, at least in part, a signal noise corresponding to the at least one sub-channel;
means for determining one or more signal impairment adjustment factors based on the S-RSSI for each of the plurality of sub-channels;
means for calculating a channel busy ratio (CBR) for each of the plurality of sub-channels based on the one or more signal impairment adjustment factors for each of the plurality of sub-channels; and
means for initiating communication via at least the at least one sub-channel of the plurality of sub-channels based, at least in part, on at least the CBR for each of the plurality of sub-channels,.
wherein the means for determining one or more signal impairment adjustment factors further comprises means for identifying one or more of the S-RSSI for each of the plurality of sub-channels as including measurement noise from one or more of DC power, signal interference, signal image, or signal leakage.

27. An article of manufacture comprising:
a non-transitory computer-readable medium having stored thereon instructions that are executable by a processor of a wireless communications device to:
measure a sidelink received signal strength indicator (S-RSSI) for each of a plurality of sub-channels;
change a value of at least one S-RSSI for at least one sub-channel of the plurality of sub-channels based, at least in part, on at least one S-RSSI adjustment value for the at least one sub-channel, the at least one S-RSSI adjustment value being based on, at least in part, a signal noise corresponding to the at least one sub-channel;
determine one or more signal impairment adjustment factors based on the S-RSSI for each of the plurality of sub-channels;
calculate a channel busy ratio (CBR) for each of the plurality of sub-channels based on the one or more signal impairment adjustment factors for each of the plurality of sub-channels; and
initiate communication via at least the at least one sub-channel of the plurality of sub-channels based, at least in part, on at least the CBR for each of the plurality of sub-channels,
wherein the determine one or more signal impairment adjustment factors further comprises identify one or more of the S-RSSI for each of the plurality of sub-channels as including measurement noise from one or more of DC power, signal interference, signal image, or signal leakage.

* * * * *